United States Patent [19]

Olsen et al.

[11] Patent Number: 5,318,660
[45] Date of Patent: Jun. 7, 1994

[54] METHOD AND APPARATUS FOR GENERATING HOT STAMPED SINGLE AND MULTI-COLOR IMAGES

[75] Inventors: Martin A. Olsen, Sands Point, N.Y.; Wilhelm P. Kutsch, Kensington, N.H.

[73] Assignee: Kensol-Olsenmark, Inc., Melville Long Island, N.Y.

[21] Appl. No.: 877,423

[22] Filed: May 1, 1992

[51] Int. Cl.⁵ .......................... B44C 1/00; B32B 31/00
[52] U.S. Cl. .................................. 156/542; 156/235; 156/238; 156/540; 156/231
[58] Field of Search ............... 156/235, 230, 231, 238, 156/245, 540, 541, 542, 249, 247

[56] References Cited

U.S. PATENT DOCUMENTS

| | | | |
|---|---|---|---|
| 2,568,463 | 9/1951 | Reynolds | 156/249 X |
| 3,519,512 | 7/1970 | Downs | 156/249 X |
| 3,532,574 | 10/1970 | Davis | 156/238 |
| 3,620,881 | 11/1971 | Kannegiesser | 156/540 X |
| 3,639,188 | 5/1970 | Vogel | 156/235 X |
| 3,951,713 | 4/1976 | Emmel | 156/201 X |
| 4,012,552 | 3/1977 | Watts | 156/234 X |
| 4,033,770 | 7/1977 | De Maes | 156/234 X |
| 4,369,082 | 1/1983 | Kerwin | 156/358 X |
| 4,379,017 | 4/1983 | Barta | 156/289 X |
| 4,409,063 | 10/1983 | Brown | 156/542 |
| 4,459,170 | 7/1984 | Kerwin | 156/449 X |
| 4,484,970 | 11/1984 | Burzlaff | 156/235 X |
| 4,539,063 | 9/1985 | Cué156 | 542 X/ |
| 4,643,789 | 2/1987 | Parker | 156/238 X |
| 4,863,543 | 9/1989 | Suiozawa | 156/249 X |
| 4,936,946 | 6/1990 | Karlyn | 156/540 X |
| 4,992,129 | 2/1991 | Sasaki | 156/249 X |
| 5,057,175 | 10/1991 | Ashton | 156/202 X |
| 5,061,334 | 10/1991 | Paules | 156/235 |
| 5,133,821 | 7/1992 | Jensen | 156/249 X |
| 5,147,495 | 9/1992 | Douglas | 156/540 |

*Primary Examiner*—David A. Simmons
*Assistant Examiner*—Charles Rainwater
*Attorney, Agent, or Firm*—Sughrue, Mion, Zinn, Macpeak & Seas

[57] ABSTRACT

A method and apparatus for generating hot stamped single and multi-colored images wherein a transferable image is generated at a first station and a substrate or container is decorated at a second station. The transferable image is generated via a hot stamping mechanism (a single or multi-head station) onto a transfer film at the first station, and the transfer image is then transferred via hot stamping onto the part or substrate at the second station via a hot stamping transfer technique referred to as foilprint.

7 Claims, 8 Drawing Sheets

METHOD AND APPARATUS FOR GENERATING HOT STAMPED SINGLE AND MULTI-COLOR IMAGES

BACKGROUND OF THE INVENTION

The present invention relates to a method and apparatus for generating hot stamped single and multicolor images whereby a transfer is generated at a first station which is part of the apparatus, and a substrate or container is decorated at a second station which also is part of the apparatus. In particular, a transferable image is generated via a hot stamping mechanism (a single or multi-head station) onto a transfer film, and the transfer image is then transferred via hot stamping onto the substrate or container to be decorated at the second station by employing a transfer technique called foilprint.

Hot stamping or transfer decorating is a method of dry printing or dry decorating. An image or design is transferred from a foil or carrier film onto a surface by application of heat and pressure.

The transfer image or design can either be preprinted on a release coated carrier or generated with an engraved, etched or formed die. In the actual stamping or transfer process, a hot die is pressed against the hot stamping foil or transfer film which is sandwiched between the die and the surface to be decorated.

Conventional hot stamping requires a die, as described above, and a hot stamping foil to create an image. The hot stamping foil is a composite of layers of coatings on a carrier, such as polyester film. The coatings are then transferred to a surface as an image, copy or solid. The foils can be metallized or non-metallized (pigments) by design, and can possess a number of inherent qualities.

Preprinted images are formed by printing a copy, text or design via silk-screen, gravure, flexo or offset onto a release coated carrier such as paper or polyester film also called a transfer film. The completed transfer, which also includes an adhesive layer, is then off-line transferred via hot stamping onto a surface to be decorated.

U.S. Pat. No. 4,409,063 (Brown) discloses an apparatus and process for hot-stamping molded plastic containers in which the container is moved passed a heated die having a platen with a printing die, the die being universally movable so that linear uniform pressure is exerted between a confronting container surface and the die surface. The uniform linear pressure between the container and the die, transfers foil to the accompaniment of rotation of the container so that a lamination of the foil is transferred onto the container surface.

Another known method is pad printing wherein wet ink is transferred from an engraved plate to a substrate. A solvent or water based ink system is wiped onto an engraved metal plate and the subsequent design or image is then picked up by a soft rubber ink pad, and transferred onto the substrate or part to be decorated. Both operations are accomplished on an apparatus referred to as a pad printer.

As is the case with any wet printing system, the pad transfer image must undergo a drying operation. Multicolored designs are accomplished by moving the substrate or part to be decorated from one pad printing station to another. Accordingly, such wet printing processes are disadvantageous in that they often require pre-printing treatment including drying time and wet handling in addition to wet cleanup of rollers, ink wells, etc. Further, any wet residue must be formally disposed of in accordance with the Environmental Protection Agency (EPA) regulations.

SUMMARY OF THE INVENTION

It is an object of the present invention to solve the above-mentioned problems by providing a method and apparatus for generating hot stamped single and multi-colored images wherein a transferable image is generated at a first station and a substrate or container is decorated at a second station. The transferable image is generated via a hot stamping mechanism (a single or multi-head station) onto a transfer film at the first station, and the transfer image is subsequently transferred via hot stamping onto the part or substrate via a hot stamping transfer technique referred to as foilprint.

More specifically, the present invention provides a method for generating an image on a substrate to be decorated, the method comprising the steps of: feeding a transfer-coated carrier web to a first station and thereafter generating a transfer image on one side of the transfer-coated carrier web at the first station. The transfer-coated carrier web having the transfer image formed thereon is then moved to a second station where the substrate to be decorated is located, and the transfer image is aligned with the substrate to be decorated. At the second station, heat and pressure are then applied to the transfer-coated carrier web on a side opposite to the one side having the transfer image formed thereon, such that the transfer image is brought into contact with the substrate and is transferred and bonded to the substrate.

The present invention further provides a two-stage apparatus for generating an image on a substrate to be decorated. The apparatus comprises a first stage at which a transfer image is generated on a transfer film, the transfer film comprising a web. Means for advancing the transfer film through the first station and a means for generating the transfer image on one side of the transfer film at the first station are provided. The two-stage apparatus further comprises a second stage at which the transfer image formed on the one side of the transfer film is transferred and bonded to the substrate. Means for moving the transfer film having the transfer image formed thereon to the second station where the substrate is located is provided. At the second station, means for applying heat and pressure to the transfer film on a side opposite to the one side having the transfer image formed thereon is provided, such that the transfer image is brought into contact with the substrate and is transferred and bonded to the substrate.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figure 1:
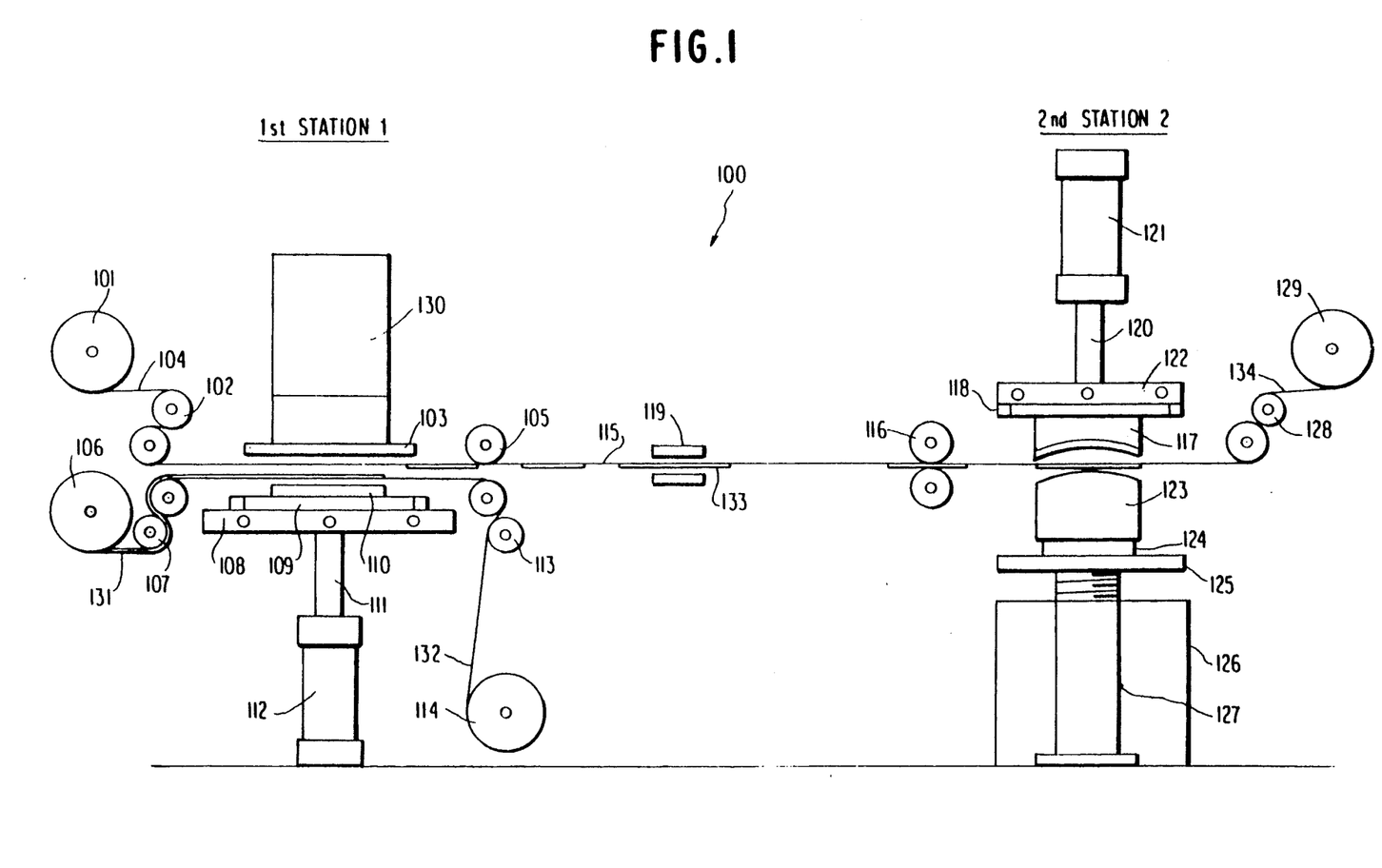
FIG. 1 is a schematic side elevation view of a two-stage foilprint apparatus for generating a single color image according to a first embodiment of the invention, wherein the two stages or stations, the conveyance path of the transfer film and foil and accompanying rollers are aligned along a single plane (the plane of the paper in FIG. 1)

The invention will now be described with reference to the drawings. As shown in FIG. 1, the two-stage or station foilprint apparatus for generating a single color image according to a first embodiment is generally denoted by the reference numeral 100. As will be described in detail below, a transfer image 133 is generated on the first station 1 and is thereafter moved to the second station 2 for transfer onto a substrate or part 123.

As shown in FIG. 1, the first station 1 comprises a transfer film unwind 101 for initially holding a release or transfer coated carrier 104. A coated polyethyleneterephthalate (PET) film or coated paper could be employed in place of the release coated carrier film 104. The invention is not limited to these materials. The transfer film 104 then passes through transfer film tensioning and web transfer nip rollers 102 before passing between a hot stamping die 110 and a removable make ready platen 103 of the first station 1. The nip rollers 102 serve as means for advancing the transfer film through the first stage or station 1. After being acted upon at the first station 1, the transfer film 104 continues on to the second station 2 as a continuous carrier web 115 as will described in more detail below.

A second unwind section 106 carries a specialized hot stamping foil 131. The specialized hot stamping foil 131 first passes between stamping foil tensioning nip and film transfer rollers 107 before moving over the hot stamping die 110. After passing over the hot stamping die 110 of the first station the specialized hot stamping foil 131 passes between rewind nip rollers 113 and then is rewound on a spent foil rewind 114 which serves as a rewind device for the spent foil 132. The unwind 106, nip rollers 107 and 113 and the rewind 114 constitute a means for advancing the hot stamping foil.

The hot stamping die 110, which serves as a means for generating the transfer image 133, is mounted on a removable chase 109. The removable chase 109 is an adjustable dovetailed chase with X-Y-R type adjustability and is clamped in place and securely positioned in contact with a heated platen 108. The X-Y-R type adjustability allows the die 110 to be finely adjusted, in relation to the transfer image 133 which the die 110 is stamping, in two directions (X,Y) and rotated in a third direction (R). In addition, the chase 109 has a levelling capability in relation to the transfer image 133 to be stamped. The heated platen or head 108 is attached to a piston 111 which in turn is part of an air cylinder 112.

The removable make ready platen 103 is mounted on a make ready support 130. The make ready platen 103 and support 130 are both adjustable. The make ready platen 103 serves as a support means for the stamping process to create a design or image.

The air cylinder 112 presses the hot stamping die 110 against the backside of the specialized hot stamping foil 131, and then brings the coated side against the coated side of the release-coated carrier 104. Under heat and pressure, e.g., 180°-300° F. and 1-2 tons PSI, a design or image 133 is transferred from the specialized hot stamping foil 131 to the underside/release-coated side of the release or transfer coated carrier 104. After the hot stamping die 110 has acted upon the backside of the specialized hot stamping foil 131 to form the transfer image onto the transfer coated carrier 104, the spent hot stamping foil 132 is then rewound on the foil rewind device 114.

The carrier 104 then continues on to the second station 2 as the design-enhanced carrier web 115. The design-enhanced carrier web 115 is guided and moved to the second station 2 by means for moving the transfer film in the form of a guide roller 105 and tension, guide and positioning nip rollers 116. A registration device 119 in the form of an optical or mechanical sensor is used to position the transfer image 133 for transfer at the second station 2.

The second station 2 comprises an air cylinder 121, a heated platen or head 122, which is attached to a piston 120, a chase 118, and a silicone rubber die 117. However, the second station 2 is not limited to the use of an air cylinder to develop pressure. Pressure can also be developed through other means such as hydraulic cylinders, or through mechanical systems such as toggle or wedge as opposed to just air. The silicone rubber die 117 serves as a means for applying heat and pressure to the transfer film and is attached to the chase 118 which, in turn, is mounted to the heated platen 122. The air cylinder 121, heated platen 122, piston 120, chase 118 and silicone rubber die 117 all form part of an upper section of the second station 2 which is disposed above the design-enhanced carrier web 115 as illustrated in FIG. 1. A pair of rewind nip rollers 128 and transfer carrier rewind device 129 also form part of the upper section of the second station 2. The transfer carrier rewind device 129 serves as a collecting device for the spent carrier substrate or web 134.

The part or substrate 123 to be decorated is mounted on a fixture 124. The fixture 124 is in turn mounted on an adjustable table 125. The adjustable table 125 is mounted via an adjustable screw 127 to a stand 126.

The transfer mechanism at the second station 2 is similar to the action at the first station 1, except that the stamping process is from the top down instead of the bottom up, as in the first station 1. More specifically, under heat and pressure (e.g., 350°-450° F. and 1-5 tons PSI), the silicone rubber die 117 presses against the backside of the carrier 115, which carries the transfer image or design 133. The image or design 133, which is located on the underside of the carrier 115, is brought in contact with the part or substrate 123, and through the stamping process it is transferred and bonded to the part 123. During the hot stamping process, under heat, pressure and dwell time, the image or design 133 releases from the release-coated carrier substrate and forms a bond to the part or substrate 123.

In general, conventional hot stamping foils are a composite of layers on a polyester film carrier. Traditionally, this sequence of a deposition of layers for a simple metallized foil is as follows:

1. A release layer
2. A top coat-color coat
3. A vacuum metallized aluminum
4. An adhesive layer designed to bond to a specific substrate.

The specialized, metallized hot stamping foil 131 for foil- print applications according to the present invention is comprised by the following layers:

1. A release layer
2. An adhesive layer designed to adhere to the substrate or part 123.
3. A vacuum metallized aluminum
4. A transparent color coat with adhesive properties to the release coated carrier 104.

Alternatively, specialized, pigment hot stamping foils or a combination of specialized, metallized and specialized, pigment hot stamping foils may be employed.

The particular hot stamping die 110 utilized to create the image or design 133 on the transfer carrier or film 104 may be formed from various materials including but not limited to: magnesium, copper, brass, steel, silicone, rubber and polymeric resins (photopolymers). A particular image or design is formed on the die via conventional engraving and/or molding methods.

The silicone rubber die 117 employed at the second station 2 in order to transfer the image 133 off of the release coated carrier 115 is constructed of a conventional heat curable silicone rubber compound. In order to overcome surface variations of up to 0.004 inch, a soft durometer silicone rubber compound is preferably employed which is mounted on a thin aluminum backing plate that provides rigidity, mounting or fastening capability, and heat transfer to the silicone rubber. The recommended durometer for slightly contoured or surface variations of up to 0.004 inch is 60-70. Substrates or parts 123 having extreme surface contours require a contoured die and fixturing. The recommended durometer of the silicone rubber die depends on the type of application, with a typical durometer being 70-80.

The present invention is not limited to the use of a flat or contoured silicone rubber die, or to vertical hot stamping applications. The hot stamping die 117 could be modified by substituting a metal die for the above-described silicone rubber die, or by incorporating a silicone rubber roll-on head.

Synchronization of the various nip and transfer rollers for positioning and registration of the transfer film 104 and the specialized hot stamping foil 131, and the stamping motions of the hot stamping die 110 of the first station 1 and the hot stamping die 117 of the second station 2 is accomplished by control devices such as proximity switches, limit switches and photoelectric switches which are interfaced into programmable logic controllers (PLCs). Typical commercially available PLCs are manufactured by Allen Bradley, General Electric, Telemecanique, and IDEL.

Figure 6:
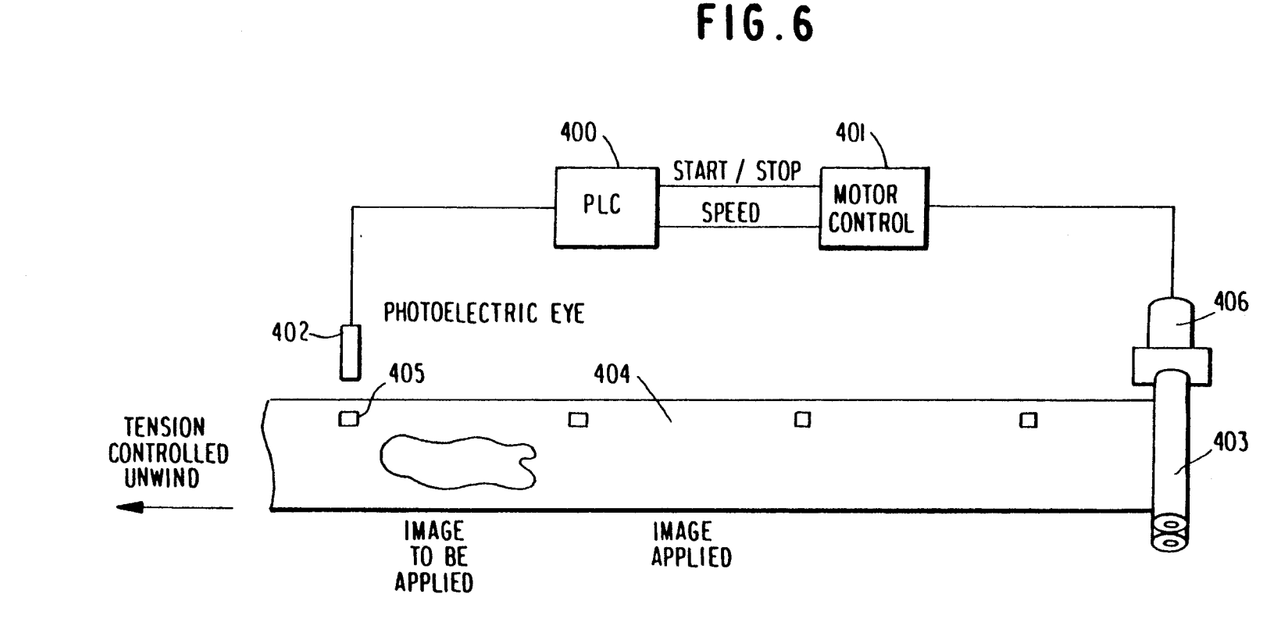
FIG. 6 is a schematic diagram showing one possible configuration for controlling synchronization of the apparatus.

As shown in FIG. 6, a photoelectric eye 402 (which corresponds, for example, to the registration device 119, 219) is connected to the PLC 400. The photoelectric eye 402 is designed to detect a registration mark 405 formed on the carrier web or film 404 (which corresponds, for example, to carrier web 115, 215). The PLC 400 is also connected to a motor control 401 for controlling, for example, a motor 406 which drives the nip rollers 403. The nip rollers 403 correspond to, for example, positioning nip rollers 116, 216.

Accordingly, the photoelectric eye 402 optically senses a registration mark 405 and sends a signal to the PLC 400. The PLC 400 in turn controls the start/stop and the advancing speed of the carrier web 404 by controlling the motor 406 which drives the nip rollers 403.

Of course, additional operations can also be interfaced with the PLC 400 as will be understood by those skilled in the art.

The operation of the two-stage foilprint apparatus as shown in FIG. 1 will now be described.

The transfer film or release coated carrier film 104 is unwound from the transfer film unwind 101 and is moved to the first station 1 by the transfer film tensioning and web transfer nip rollers 102. Initially, a leader portion of the transfer film 104 is threaded through the first and second stations 1 and 2 of the apparatus 100 and wound onto the rewind device 129 of the second station 2. Likewise, a leader portion of the specialized hot stamping foil 131 is threaded through the various rollers and wound onto the spent foil rewind 114. The specialized hot stamping foil 131 is unwound from the hot stamping foil unwind 106 simultaneously with the unwinding of the transfer film 104 such that specialized hot stamping foil 131 is moved by the stamping foil tensioning nip and film transfer rollers 107 into position above the hot stamping die 110 as shown in FIG. 1. When the transfer film 104 and specialized hot stamping foil 131 are both positioned between the hot stamping die 110 and the make ready platen 103, movement of the transfer film 104 and the specialized hot stamping foil 131 is stopped and the heater head 108 is activated such that the hot stamping die 110 is heated to a temperature of 180°-300° F. and the pressure device such as air cylinder 112 is operated to raise the piston 111 to thereby press the hot stamping die 110 against the backside of the specialized hot stamping foil 131. Accordingly, the coated side of the hot stamping foil 131 is pressed against the coated side of the transfer film 104. Under the heat and pressure of the hot stamping die 110, a design or image 133 is transferred from the specialized hot stamping foil 131 to the underside/release-coated side of the transfer film 104.

After the image or design 133 has been transferred onto the transfer film 104, the transfer film is then moved away from the first station 1 as the design-enhanced carrier web 115 by the positioning nip rollers 116 toward the second station 2. Further, after the image has been transferred from the specialized hot stamping foil 131 onto the transfer film 104, the spent foil 132 is moved away from the hot stamping die 110 by the rewind nip rollers 113 and is rewound on the spent foil rewind 114.

As the image or design 133 moves with the carrier web 115 toward the second station 2, the registration device 119 senses a registration mark and sends a signal to the controller (see FIG. 6) such that the image 133 is properly positioned for transfer onto the substrate or part 123 at the second station 2. Once the image 133 is properly positioned over the part 123 at the second station 2, the movement of the design-enhanced carrier web 115 is stopped.

With the heater head 122 activated such that the hot stamping die 117 is heated to a temperature of 350°–450° F., the pressure device such as air cylinder 121 is activated so as to move the piston 120 downwardly to thereby press the hot stamping die 117 with 1-5 tons PSI against the backside of the design-enhanced carrier web 115. The image 133, which is located on the underside of the design-enhanced carrier web 115, is brought into contact with the part or substrate 123 and is transferred and bonded by the heat and pressure to the part or substrate 123.

The transfer of the design or image 133 onto the part 123 at the second stage or station 2 takes place within seconds of the transfer of the image 133 onto the transfer film 104 at the first station 1. Thus, the decorating process and transfer process are carried out on a single two-stage machine within seconds of each other.

Once the part or substrate 123 has been decorated at the second station 2 with the image 133, the part or substrate 123 is removed from the adjustable table 125 either manually or automatically in the conventional manner. Likewise, a new part or substrate is placed on the table 125 to be decorated at the second station 2 by the hot stamping die 117. The undecorated part or substrate 123 again may be positioned on the table 125 either manually or automatically by an automatic parts feeder as is well known in the art.

Figure 2:
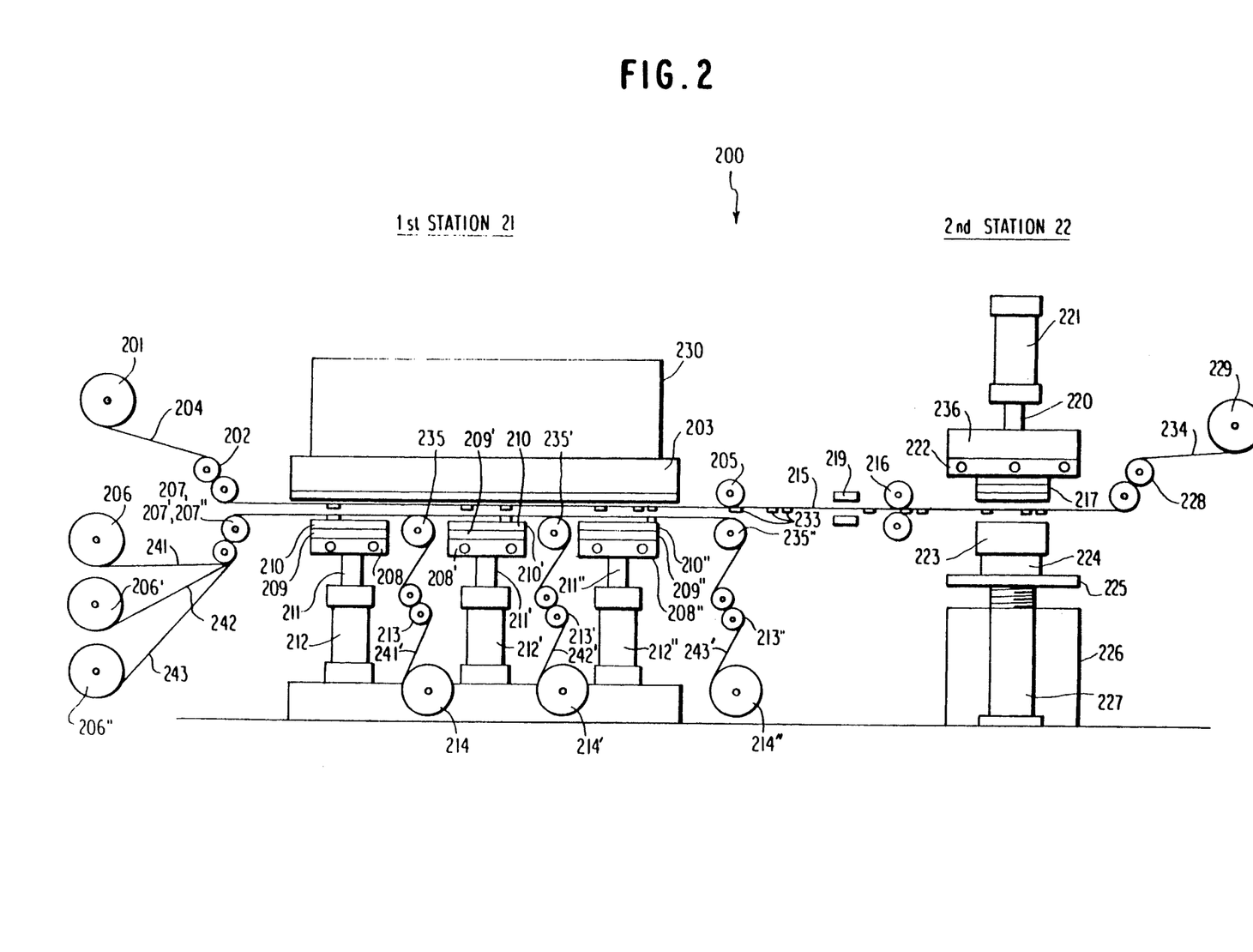
FIG. 2 is a schematic side elevation view of a two-stage multi-head foilprint apparatus for generating multi-color images according to a second embodiment of the invention.
Figure 2A:
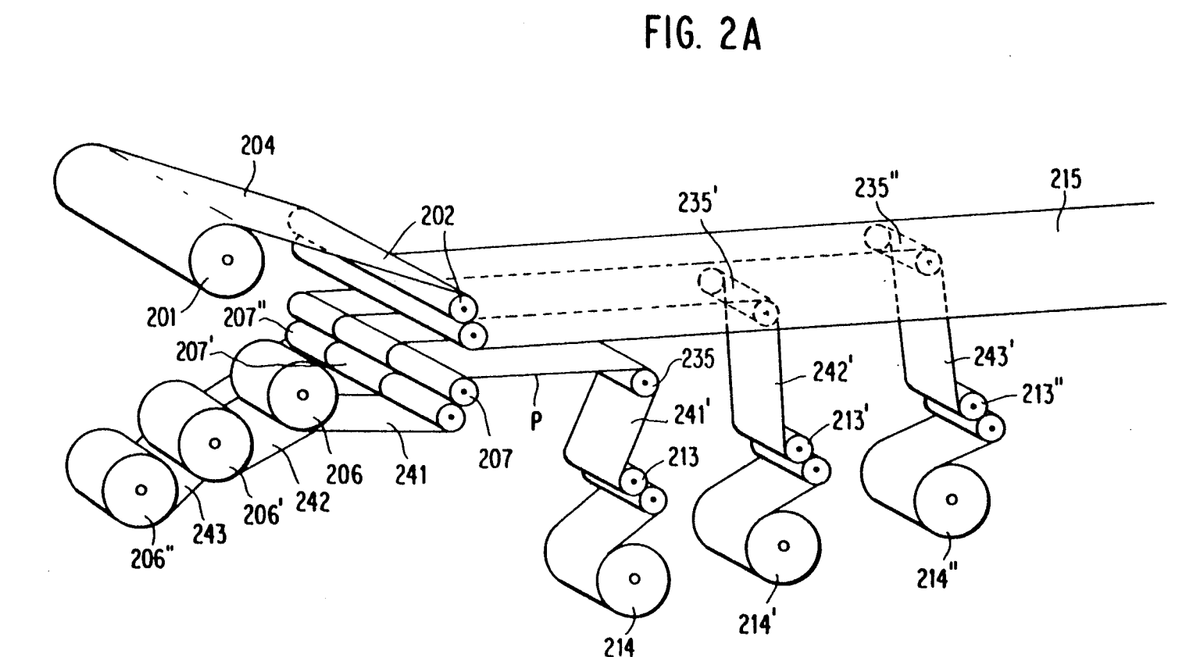
FIG. 2A is a schematic perspective view of the first station of the multi-head foilprint apparatus of FIG. 2 without the hot stamping dies, the make ready support and the make ready platen for the sake of clarity.
Figure 2B:
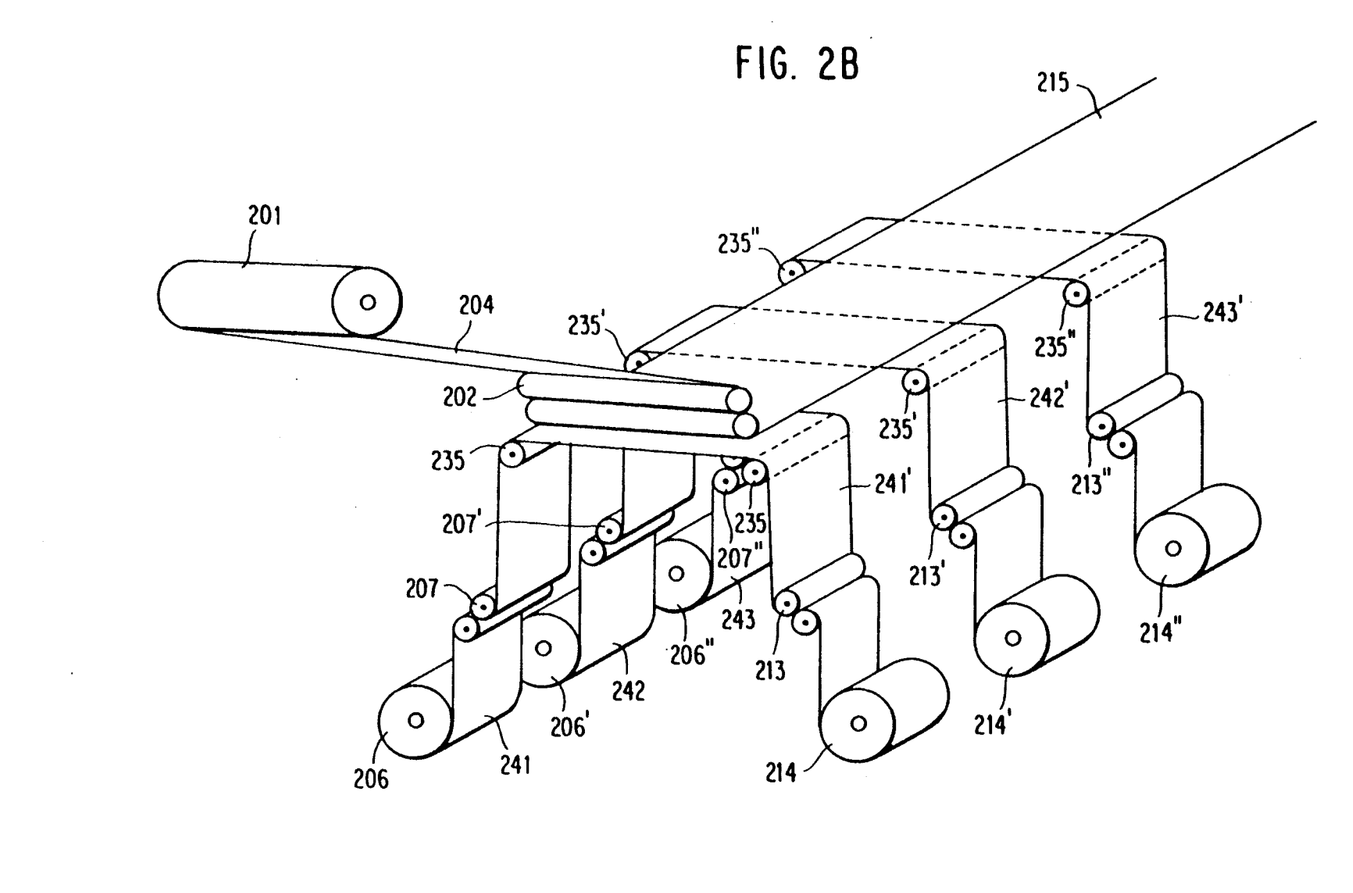
FIG. 2B is a schematic perspective view similar to FIG. 2A but showing the first station of a variation of the apparatus of FIGS. 2 and 2A.

FIGS. 2, 2A and 2B illustrate a second embodiment according to the invention wherein a two-stage or station multi-head foilprint apparatus 200 for generating multi-colored images is provided. Structural elements similar to those illustrated for the first embodiment are designated by the same reference numerals but preceded by the numeral 2. The multi-color/multi-head foil printer 200 as shown in FIG. 2 likewise includes a first station 21 and a second station 22. The first station 21 of the second embodiment is very similar to the first station 1 of the first embodiment in that it serves the same function of creating an image 233 on a transfer film or released coated carrier 204, with the exception that several colors can be employed and multi-color images or designs 233 can be created. In the second embodiment of FIG. 2, a three-color transferable image 233 can be created, which is subsequently transferred to a part or substrate 223 at the second station 22 as will be described in more detail below.

As shown in FIG. 2, the first station 21 comprises a transfer film unwind 201 for initially holding a release or transfer coated carrier or film 204. The transfer film 204 then passes through transfer film tensioning and web transfer nip rollers 202 before passing between a series of hot stamping dies 210, 210' and 210" and a removable make ready platen 203 of the first station 21. After being acted upon at the first station 21, the transfer film 204 continues on to the second station 22 as a design-enhanced carrier web 215 as will be described in more detail below.

For the sake of clarity, FIG. 2A shows a perspective view of transfer film unwind 201, transfer nip rollers 202 and the means for advancing the foil, without showing the hot stamping dies 210, 210' and 210", the make ready support 230 and the make ready platen 203.

A plurality of unwinds 206, 206' and 206" are provided and each one carries a specialized pigment color foil 241, 242 and 243, respectively. As shown in FIG. 2A, the specialized pigment color foils 241, 242 and 243 are respectively fed from the unwinds 206, 206' and 206" in side-by-side relation to each other. Each of the specialized pigment color foils 241-243 may be a different color. While three foil unwinds 206, 206' and 206" for holding the three separate color foils are shown in the second embodiment, clearly the invention is not limited to this particular number and more or less unwinds and colors could be employed. The three specialized pigment color foils 241, 242 and 243, arranged side-by-side with respect to each other, first pass between stamping foil tensioning nip and transfer rollers 207, 207' and 207", respectively, which are also arranged in a side-by-side relationship (see FIG. 2A), before moving over the hot stamping dies 210, 210' and 210".

The hot stamping dies 210, 210' and 210", and related structure, are offset with respect to each other so as to be aligned with the corresponding specialized pigment color foils 241-243. In other words, hot stamping die 210 is positioned underneath the foil 241, hot stamping die 210' is positioned underneath the foil 242, and hot stamping die 210" is positioned underneath the foil 243.

After the three specialized pigment color foils 241-243 pass through the foil tensioning nip and film transfer rollers 207, 207' and 207", respectively, they exit the transfer rollers in a single plane P and thereafter pass over the respective hot stamping die 210, 210' and 210". After passing over the corresponding hot stamping die 210, 210' and 210" of the first station 21, the spent specialized hot stamping foils 241', 242' and 243' pass between rewind nip rollers 213, 213' and 213", respectively, and then are rewound separately on corresponding rewind devices 214, 214' and 214". Foil advance idler rollers 235, 235' and 235" are additionally provided after each of the hot stamping dies 210, 210' and 210" in order to further facilitate advancement of each of the specialized hot stamping foils 241-243 through the first station 21.

Since the means for advancing the foil (hereinafter a foil advance system) including the hot stamping foil unwinds 206, 206' and 206", the foil tensioning and transfer nip rollers 207, 207' and 207", the foil advance idler rollers 235, 235' and 235", the rewind nip rollers 213, 213' and 213", and the spent foil rewinds 214, 214' and 214" are aligned so as to feed the transfer film 204 and the specialized pigment color foils 241-243 along parallel paths during hot stamping in the embodiment of FIGS. 2 and 2A, the three-color image that is formed by the three hot stamping dies 210, 210' and 210" is limited to the location of the hot stamping foils 241-243 over the respective hot stamping dies 210, 210' and 210". Of course, individual foil advance systems could likewise be employed for each specialized pigment color foil 241, 242 and 243 such that the colors could be stamped onto the transfer carrier 204 in any desired location. FIG. 2B shows such a modified form of the second embodiment, with like elements being designated by like reference numerals. In such a modified device, each of the separate individual foil advance systems is aligned with a respective hot stamping die 210, 210' and 210" and feeds a corresponding one of the foils 241, 242 and 243 in a direction perpendicular with respect to the travel path of the transfer film 204, as shown in FIG. 2B.

Each of the hot stamping dies 210, 210' and 210" is designed to create a portion of the three-color transfer image 233. As in the first embodiment of FIG. 1, each of the hot stamping dies 210, 210' and 210" of the second embodiment includes a removable chase 209, 209' and 209", respectively. Each removable chase 209, 209' and 209" is clamped in placed and positioned in contact with a corresponding heated platen or head 208, 208' and 208", respectively. Also, each removable chase has X-Y-R type adjustability as described above with respect to the first embodiment. Each of the heated heads 208, 208' and 208" is in turn attached to a corresponding piston 211, 211' and 211" which is part of a corresponding pressure device such as an air cylinder 212, 212' and 212", respectively.

The removable make ready platen 203 is mounted on a make ready support 230. As in the first embodiment as shown in FIG. 1, the make ready platen 203 and the support 230 are both adjustable. The make ready platen 203 serves as a support means for the stamping process carried out by each of the hot stamping dies 210, 210' and 210" in order to create a three-color design or image 233.

Once the three-color image 233 has been formed on the transfer film 204, the transfer film 204 continues on to the second station 22 as the design-enhanced carrier web 215 which is guided and moved to the second station 22 by means of a guide roller 205 and web tensioning nip and positioning rollers 216, respectively. As in the first embodiment, a registration device 219 in the form of an optical or mechanical sensor is used to position the three-color transfer image 233 for transfer at the second station 22.

The second station 22 comprises an air cylinder 221, a stamping head 236, which is attached to a piston 220, a heater head 222, and a hot stamping die 217. The hot stamping die 217 may again be formed of silicone rubber as in the first embodiment.

A pair of rewind tensioning and transfer nip rollers 228 and a transfer film rewind 229 are provided for collecting or taking up the spent carrier substrate or web 234.

The part or substrate 223 to be decorated is mounted on a fixture 224, and the fixture 224 is in turn mounted on an adjustable table 225. The adjustable table 225 is mounted via an adjustable screw 227 to a stand 226.

Conventionally, the sequence of layers of a simple pigment color foil is as follows:
1. A release layer (strip coat)
2. A pigment color layer
3. An adhesive layer designed to bond to a specific substrate.

The specialized pigment color foils 241, 242 and 243 for foilprint applications according to the present invention are each comprised by the following layers:
1. A release-strip layer
2. An adhesive layer designed to bond to the substrate or part 223
3. A pigment color layer with optional adhesive properties to the release coated carrier or transfer film 204 built in.
4. If bonding is marginal, then a transparent adhesive layer designed to bond to the release coated carrier or transfer film 204 is required.

Alternatively, specialized, metallized hot stamping foils or a combination of specialized pigment and specialized, metallized hot stamping foils may be employed.

Each of the hot stamping dies 210, 210' and 210" may be formed of the various materials pointed out above with respect to the hot stamping die 110 in the first embodiment. Likewise, the hot stamping die 217 employed at the second station 22 may take the form of a silicone rubber die, the particulars of which are set forth above with respect to the hot stamping die 117 of the first embodiment.

Likewise, synchronization of the various nip and transfer rollers for positioning and registration of the transfer film 204 and the specialized multi-color foils 241, 242 and 243, and the stamping motions of the hot stamping dies 210, 210' and 210" of the first station 21 and the hot stamping die 217 of the second station 22 is accomplished by control devices which are interfaced into PLCs as in the first embodiment.

The operation of the two-stage foilprint apparatus according to the second embodiment as shown in FIG. 2 is very similar to the operation of the apparatus according to the first embodiment, except that three separate hot stamping dies 210, 210' and 210" are operated to apply heat and pressure thereby to form separate color images on the underside of the transfer film 204.

In particular, the specialized pigment color foil 241 is unwound from the foil unwind 206 by the foil tensioning and nip rollers 207 into position above the first hot stamping die 210. The transfer film 204 is also moved into position above the first hot stamping die 210. When the transfer film 204 and the specialized hot stamping foil 241 are positioned between the hot stamping die 210 and the make ready platen 203, movement of the transfer film 204 and the specialized hot stamping foil 241 is stopped. The first hot stamping head 210 then applies heat and pressure to the specialized pigment color foil 241 which is aligned therewith so as to press the same against the coated side of the transfer film 204. Accordingly, one color of the three-color image 233 is transferred from the corresponding specialized pigment color foil 241 to the underside/release-coated side of the transfer film 204.

The transfer film 204 then moves to the next hot stamping head 210' for application of the second color of the three-color image 233. In particular, the specialized pigment color foil 242, which is aligned with the second hot stamping die 210', and the transfer film 204 having the first color transferred thereon are moved into position over the second die 210' and the transfer film 204 and specialized foil 242 are stopped. Heat and pressure are then applied by the second hot stamping head 210' thereby to transfer the second color of the three-color image 233 to the underside of the transfer film 204.

Finally, the transfer film 204 and the specialized pigment color foil 243 are moved into position over the last hot stamping die 210" such that the third of the three specialized pigment color foils 241-243 is positioned over the hot stamping die 210". After the transfer film 204 and specialized hot stamping foil 243 are stopped in position over the hot stamping die 210", heat and pressure are applied so that the third color of the three-color image 233 is transferred onto the underside of the transfer film 204.

After the three-color image or design 233 has been transferred onto the transfer film 204, the transfer film is then moved away from the first station 21 as the design-enhanced carrier web 215 by the positioning nip rollers 216 toward the second station 22. The remaining operation of the second embodiment is the same as that of the first embodiment and a detailed discussion will be dispensed with for the sake of brevity.

Figure 3:
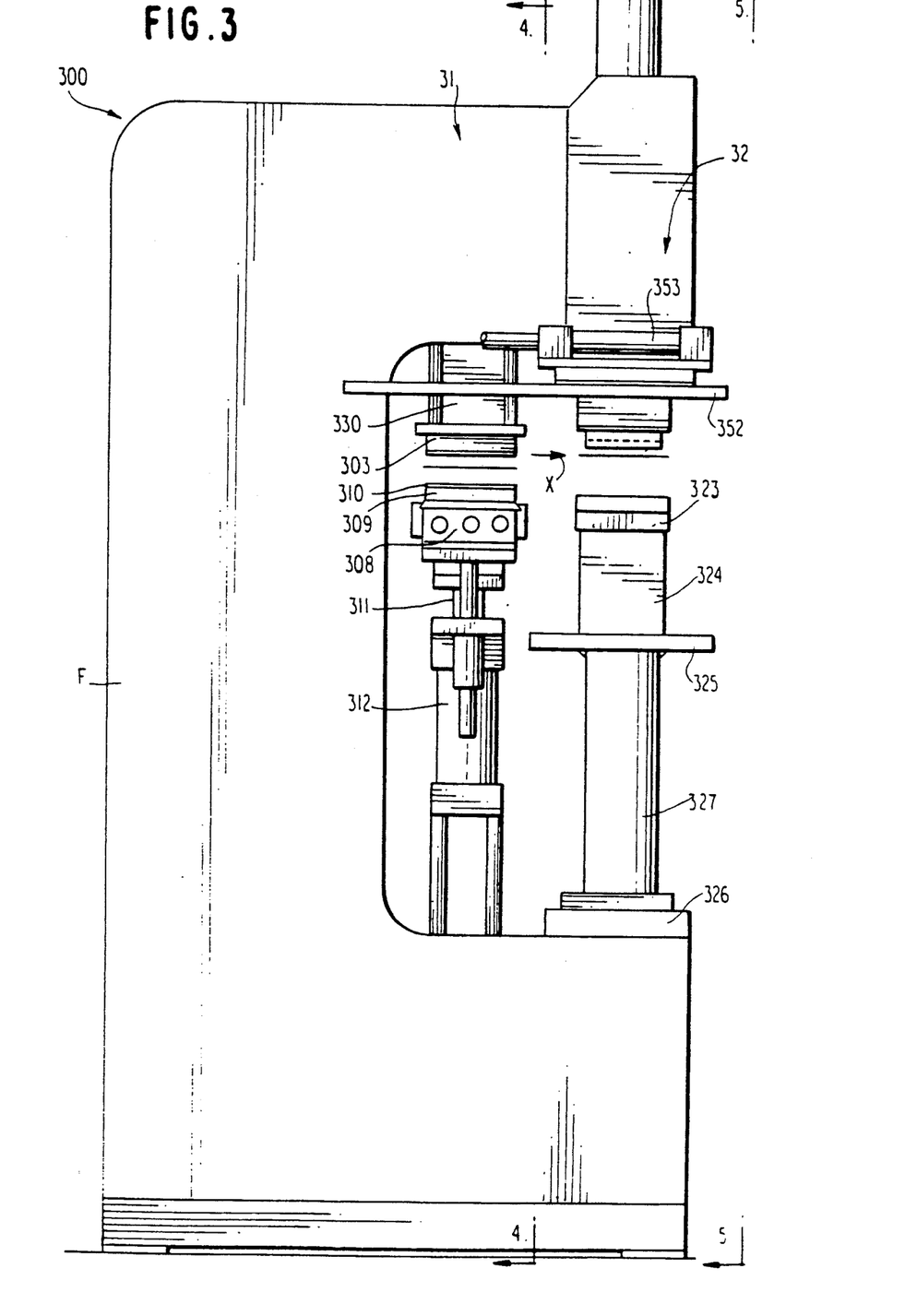
FIG. 3 is a schematic side elevation view of a two-stage foilprint apparatus for generating a single color image according to a third embodiment of the invention, wherein the two stations are aligned along a first plane, and the accompanying rollers and foil advance direction and transfer film advance direction are aligned so as to be perpendicular to the first plane.
Figure 4:
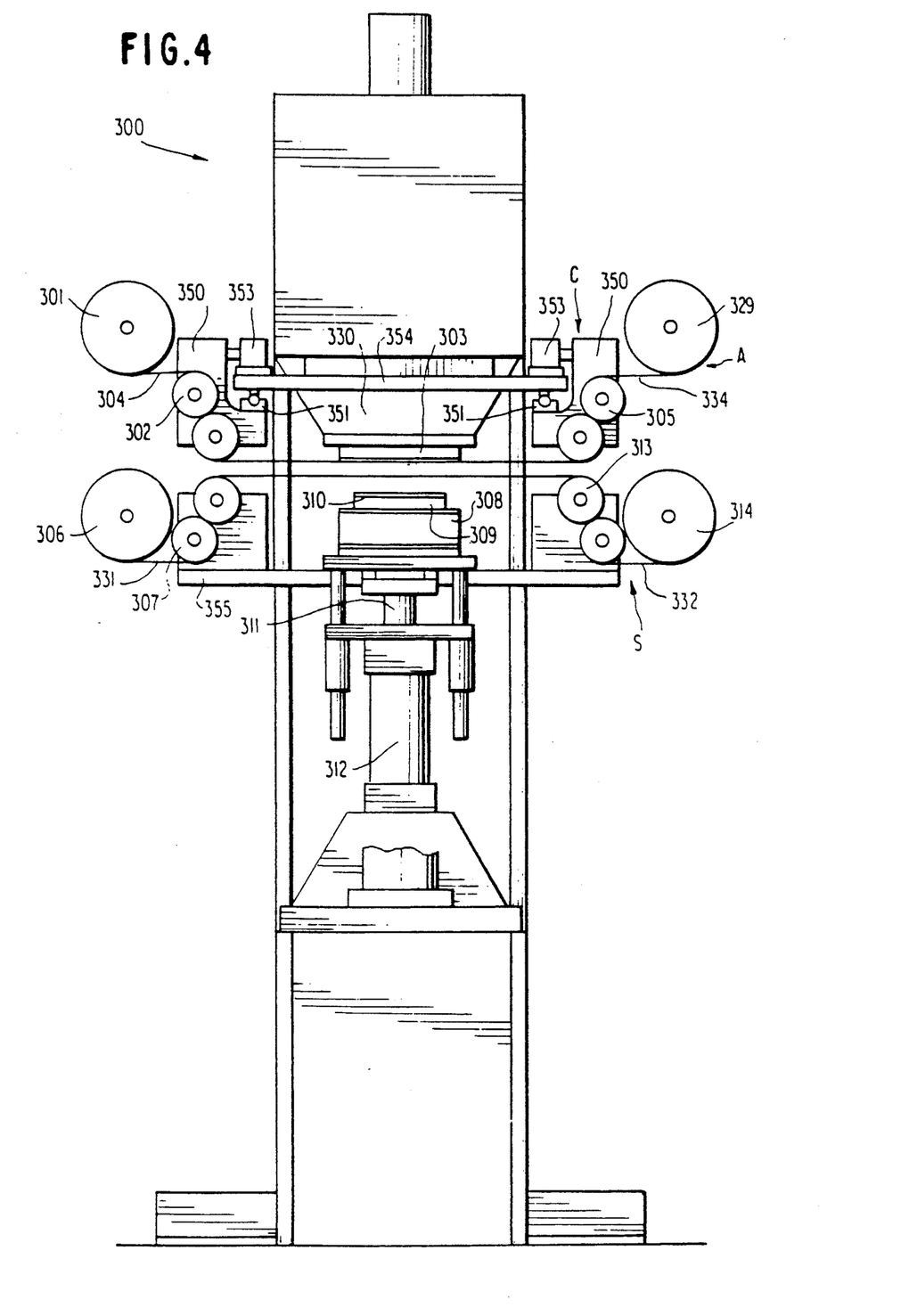
FIG. 4 is a schematic elevation view of the apparatus according to the third embodiment along the lines 4—4 in FIG. 3.
Figure 5:
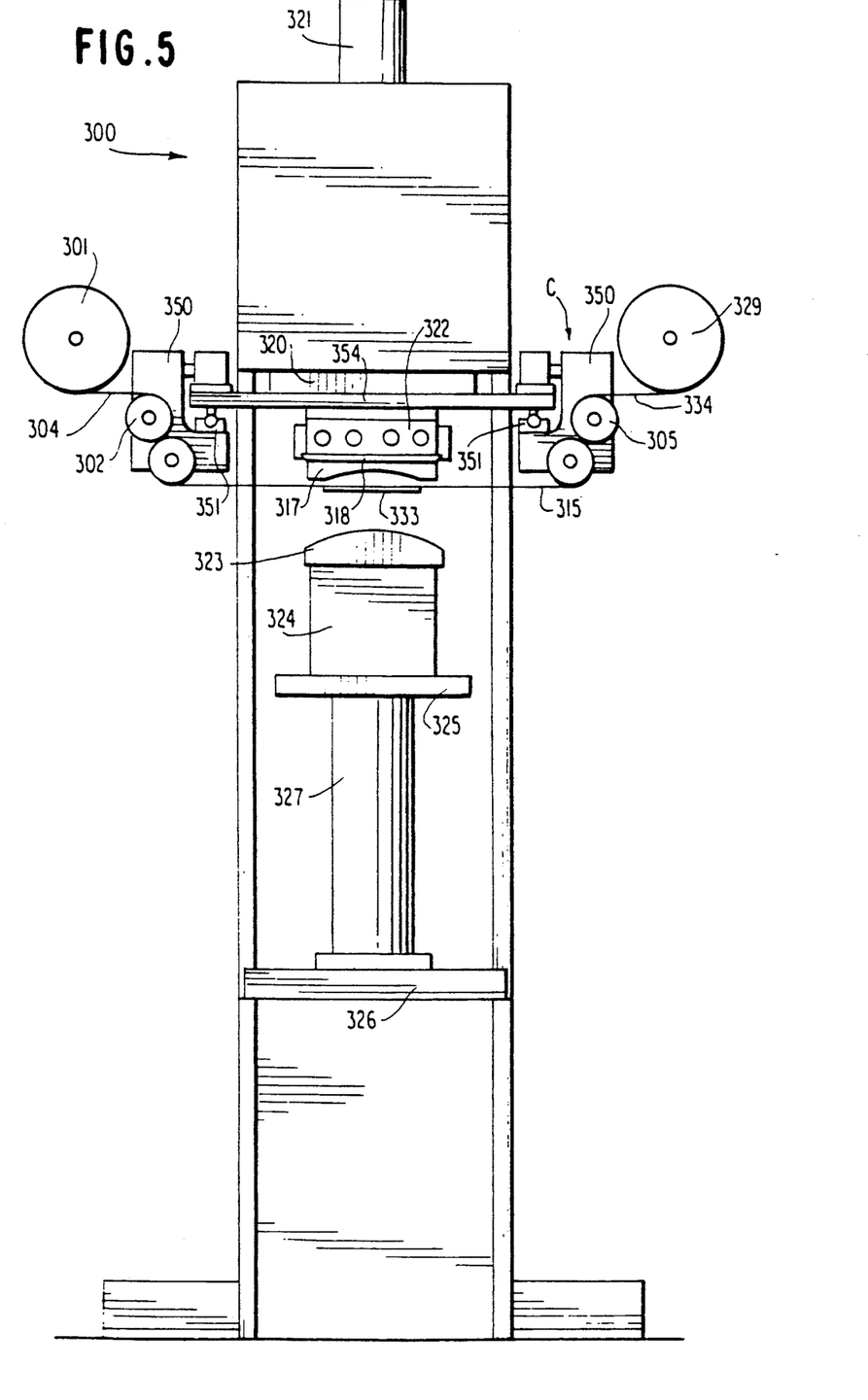
FIG. 5 is a schematic elevation view of the apparatus according to the third embodiment along the lines 5—5 in FIG. 3.

FIGS. 3-5 illustrate a third embodiment according to the invention wherein a two-stage or station foilprint apparatus 300 for generating a single color image is provided. Structural elements similar to those illustrated for the first embodiment are designated by the same reference numerals but preceded by the numeral 3.

As shown in FIGS. 3-5, in the foil printer apparatus 300 according to the third embodiment, the first station 31 and the second station 32 are aligned along a first plane (i.e., the plane of the paper as shown in FIG. 3), and the accompanying rollers and foil advance direction and transfer film advance direction are aligned so as to be perpendicular to the first plane (see the sectional views shown in FIGS. 4 and 5). As will be described in detail below, a transfer image 333 is generated on the first station 31 and is thereafter moved to the second station 32 for transfer onto a substrate or a part 323.

As shown in FIG. 3, the two-stage foilprint apparatus 300 according to the third embodiment includes a C-shaped frame F. The first and second stations 31 and 32 are positioned side-by-side within the opening of the C-shaped frame F.

As best seen in FIGS. 4 and 5, a transfer film unwind 301 is provided for initially holding the transfer film or release-coated carrier 304. The transfer film 304 then passes through transfer film tensioning and web transfer nip rollers 302 before passing between a hot stamping die 310 and a removable make ready platen 303 of the first station 31. After being acted upon by the hot stamping die 310, the transfer film 304 then passes between transfer film tensioning and web transfer nip rollers 305 before being wound up on a transfer film rewind 329 as spent carrier substrate or web 334. The transfer film unwind 301, the nip rollers 302, the nip rollers 305 and the transfer film rewind 329 constitute means for advancing said transfer film through the first station or stage (hereinafter a transfer film advance A) which is movable back and forth between the first station 31 and the second station 32 (see FIG. 3). With respect to FIGS. 4 and 5, the transfer film advance A is movable by a carriage means C in and out of the plane of the paper to shift the transfer film 304 between the first and second stations 31 and 32. The carriage means C serves as a means for moving the transfer film to the second stage and will be described in more detail below.

A second unwind section 306 carries a specialized hot stamping foil 331. The specialized hot stamping foil 331 first passes between stamping foil tensioning an web transfer nip rollers 307 before moving over the hot stamping die 310. After passing over the hot stamping die 310, the specialized hot stamping foil 331 passes between rewind nip rollers 313 and then is rewound on a spent foil rewind 314 which serves as a rewind device for the spent foil 332. The unwind 306, the stamping foil tensioning and web transfer nip rollers 307, the rewind nip rollers 313 and the spent foil rewind 314 are mounted on a stationary draw arm 355 (see FIG. 4) and form means for advancing the foil (hereinafter a specialized foil advance S). Like the transfer film advance A described above, the specialized foil advance S is situated perpendicular with respect to the C-shaped frame F of the foilprint apparatus 300. However, the specialized foil advance S is fixedly mounted such that the specialized hot stamping foil 331 only passes over the hot stamping die 310. In other words, the specialized foil advance S does not move between the first and second stations 31 and 32.

The hot stamping die 310, which creates the transfer image 333, is mounted on a removable chase 309. The removable chase 309 is an adjustable dovetailed chase with X-Y-R type adjustability as in the first embodiment and is clamped in place and securely positioned in contact with a heated platen 308. The heated platen or head 308 is attached to a piston 311 which in turn is part of an air cylinder 312. While an air cylinder 312 and piston 311 are shown, the invention is not limited to the use of an air cylinder and other well known drive means may be employed, such as a hydraulically driven piston and cylinder arrangement. The hot stamping die 317 of the second station 32 is likewise not limited to an air driven piston/cylinder. Also, the hot stamping dies of the first and second embodiments are not limited to an air cylinder type drive.

The removable make ready platen 303 is mounted on a make ready support 330. The make ready platen 303 and support 330 are both adjustable. The make ready platen 303 serves as a support means for the stamping process to create the design or image 333. The air cylinder 312 presses the hot stamping die 310 against the backside of the specialized hot stamping foil 331, and then brings the coated side against the coated side of the release-coated carrier or transfer film 304. Under heat and pressure, e.g., 180°-300° F. and 1-2 tons PSI as in the first embodiment, a design or image 333 is transferred from the specialized hot stamping foil 331 to the underside/release-coated side of the release-coated carrier or transfer film 304. After the hot stamping die 310 has acted upon the backside of the specialized hot stamping foil 331 to form the transfer image 333 onto the transfer film or carrier 304, the spent hot stamping foil 332 is then rewound on the foil rewind device 314.

The transfer film 304 is now ready for movement to the second station 32 as a design-enhanced carrier web 315. The design-enhanced carrier web 315 is moved laterally with respect to the C-shaped frame F (see the arrow X in FIG. 3) from the first station 31 to the second station 32 by virtue of the fact that the carriage means C includes a pair of movable carriage arms 350 located on opposite sides of the C-shaped frame F. Each of the carriage arms 350 is in turn mounted on a corresponding roller bearing assembly 351. Each of the roller bearing assemblies 351 rides along a corresponding guide bar 352 (see FIG. 3). Further, each of the carriage arms 350 is connected to a corresponding drive cylinder 353. The housings of the two drive cylinders 353 located on opposite sides of the C-shaped frame are mounted on a common stationary support member 354.

The second station 32 comprises a pressure device such as an air cylinder 321, a heated platen or head 322, which is attached to a platen 320. The platen 320 is in turn attached to a piston (not shown) of the air cylinder 321. A silicone rubber die 317 is attached to a chase 318, which, in turn, is mounted to the heated platen 322.

The part or substrate 323 to be decorated is mounted on a fixture 324. The fixture 324 is in turn mounted on an adjustable table 325. The adjustable table 25 is mounted via an adjustable screw 327 to a stand 326 or a stationary table.

As in the first embodiment, the transfer mechanism at the second station 32 is similar to the action of the first station 31, except that the stamping process is from the top down instead of from the bottom up, as in the first station 31. In particular, once the design-enhanced carrier web 315 has been moved from the first station 31 to the second station 32 by means of the carriage arms 350 into position over the part 323 (see FIG. 5), the image or design 333, which is located on the underside of the carrier 315, is brought into contact with the part or substrate 323, and through the stamping process (e.g., 350°–450° F. and 1–5 tons PSI) the design is transferred and bonded to the part 323.

After the part 323 has been decorated, the decorated part may be removed either manually or automatically and a new part substituted therefor as discussed above with respect to the first embodiment. Further, the spent transfer film 334 is then wound onto the transfer film rewind 329 and the transfer film advance A is moved back to the first station 31 by the carrier arms 350 so that a new design or image may be formed on the transfer film 304 at the first station 31.

The hot stamping dies 310 and 317 may be formed of the materials described above with respect to the first embodiment.

Synchronization of the various nip and transfer rollers, movement of the carriage arms between the first and second stations, positioning and registration of the transfer film and the specialized hot stamping foil, and the stamping motions of the hot stamping dies 310 and 317 are accomplished by control devices which are interfaced into PLCs as in the first embodiment.

While the embodiment of FIGS. 3–5 is shown for creating a single color image 333, the third embodiment can be modified to carry more than one hot stamping foil thereby to create multi-color designs. This is accomplished by modifying the unwind section to accommodate multiple unwinds or rolls 306 of hot stamping foil and modifying the spent foil rewind to accommodate the additional rolls in a manner similar to the second embodiment. Likewise, the C-shaped frame could be elongated to include additional hot stamping dies 310. Accordingly, separate foil advance devices could be provided for each individual hot stamping die.

While all three embodiments disclosed herein utilize a hot stamping die to create the image or design on the transfer carrier, the image or design could alternatively be created on a computer, and then transferred to the transfer carrier web via laser printing or a dot matrix printhead. The dot matrix printhead would need to have heated printing tips in order to improve adhesion of the transferred image to the transfer film or carrier web. Another alternative would be to utilize thermal transfer technology to create the image or design on the transfer film.

It is contemplated that numerous modifications may be made to the foilprint apparatus and method of the present invention without departing from the spirit and scope of the invention as defined in the following claims.

What is claimed is:

1. A two-stage apparatus for generating an image on a substrate to be decorated, said apparatus comprising:
   a) a first stage at which a transfer image is generated on a transfer film, said transfer film comprising a web;
   b) means for advancing said transfer film in an advancing direction through said first stage;
   c) means for generating said transfer image on one side of said transfer film at said first stage;
   d) a second stage at which said transfer image formed on the one side of said transfer film is transferred and bonded to the substrate;
   e) means for moving said transfer film having said transfer image formed thereon to said second stage, the substrate being located at said second stage;
   f) means, at said second stage, for applying heat and pressure to said transfer film on a side opposite to said one side having said transfer image formed thereon, such that said transfer image is brought into contact with the substrate and is transferred and bonded to the substrate; and
   g) a C-shaped frame for supporting said first and second stages, wherein said means for moving moves said transfer film from said first stage to said second stage without advancing said transfer film in the advancing direction.

2. The two-stage apparatus according to claim 15, wherein said first and second stages are disposed side-by-side in said C-shaped frame and are aligned along a first plane, and wherein said means for advancing said transfer film through said first stage is disposed perpendicular to said first plane.

3. The two-stage apparatus according to claim 2, wherein said means for moving said transfer film to said second stage comprises a carriage means, said carriage means movably supporting said means for advancing said transfer film, such that said means for advancing said transfer film is movable between said first and second stages.

4. The two-stage apparatus according to claim 3, wherein said means for advancing said transfer film comprises a transfer film unwind for storing said transfer film, a plurality of nip rollers and a transfer film rewind for taking-up said transfer film after said transfer image has been transferred and bonded to the substrate at said second stage.

5. A two-stage apparatus for generating an image on a substrate to be decorated, said apparatus comprising:
   a) a first stage at which a transfer image is generated on a transfer film, said transfer film comprising a web;
   b) means for advancing said transfer film through said first stage;
   c) means for generating said transfer image on one side of said transfer film at said first stage;
   d) a second stage at which said transfer image formed on the one side of said transfer film is transferred and bonded to the substrate;
   e) means for moving said transfer film having said transfer image formed thereon to said second stage, the substrate being located at said second stage;
   f) means, at said second stage, for applying heat and pressure to said transfer film on a side opposite to said one side having said transfer image formed thereon, such that said transfer image is brought into contact with the substrate and is transferred and bonded to the substrate; and
   g) a frame for supporting said first and second stages, wherein said first and second stages are disposed side-by-side with respect to said frame and are aligned along a first plane, and wherein said means for advancing said transfer film through said first stage is disposed perpendicular to said first plane.

6. The two-stage apparatus according to claim 5, wherein said means for moving said transfer film to said second stage comprises a carriage means, said carriage means movably supporting said means for advancing said transfer film, such that said means for advancing said transfer film is movable between said first and second stages.

7. The two-stage apparatus according to claim 6, wherein said means for advancing said transfer film comprises a transfer film unwind for storing said transfer film, a plurality of nip rollers and a transfer film rewind for taking-up said transfer film after said transfer image has been transferred and bonded to the substrate at said second stage.

* * * * *